Nov. 20, 1951  M. J. ISAAC  2,575,626
FISHING LURE
Filed April 24, 1950
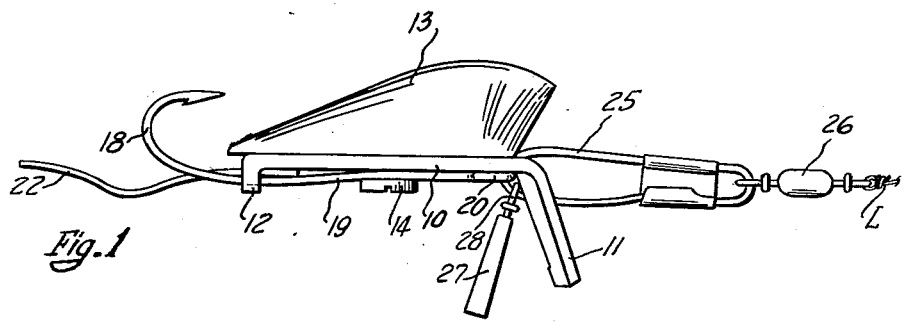
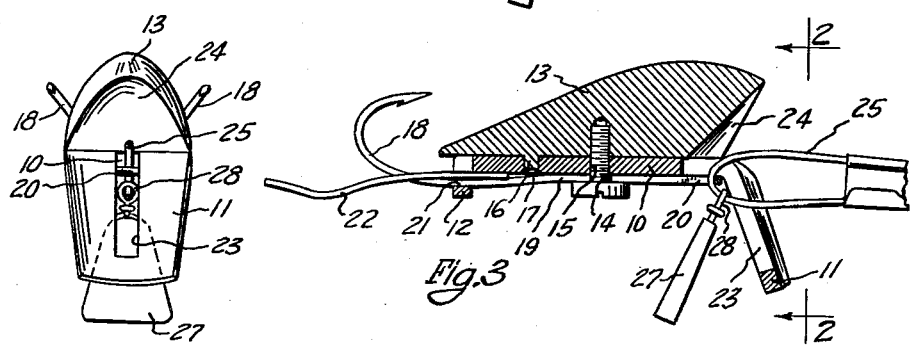
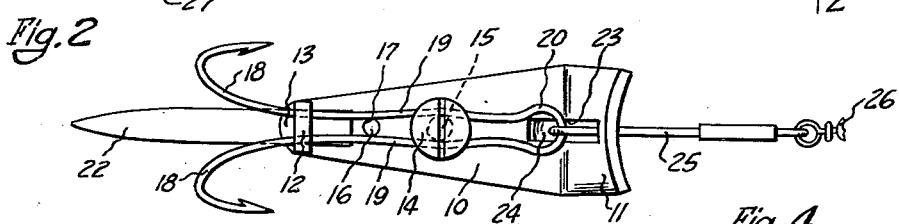
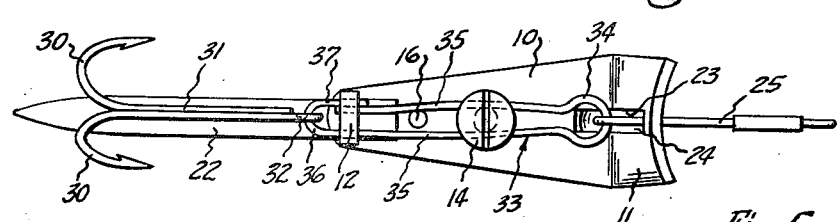
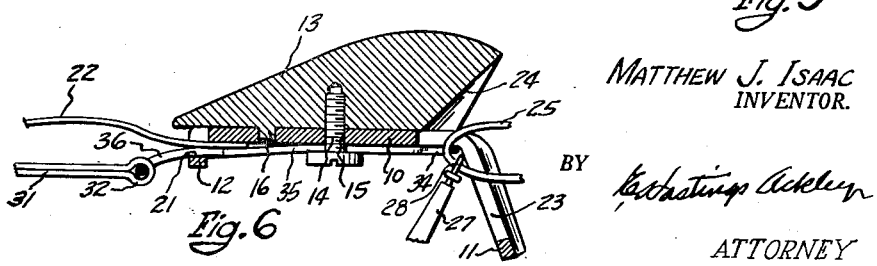
MATTHEW J. ISAAC
INVENTOR.
BY
ATTORNEY Patented Nov. 20, 1951

2,575,626

UNITED STATES PATENT OFFICE 2,575,626

FISHING LURE

Matthew J. Isaac, Dallas, Tex.

Application April 24, 1950, Serial No. 157,743

12 Claims. (Cl. 43—42.08)

This invention relates to new and useful improvements in fishing lures, and more particularly to casting plugs.

One object of the invention is to provide a fishing lure having improved means for connecting the fishing line with the hooks, whereby the danger of losing the hooks from the line and lure is minimized.

A particular object of the invention is to provide a lure wherein the lure body, the hooks, and the downwardly and forwardly inclined spoon or deflecting plate at the front of the lure body for causing a vibratory or wiggling movement of the lure are connected together by a single screw, facilitating assembly and reducing cost.

An important object of the invention is to provide, in a lure of the character described, means for varying the weight of the lure, and wherein additional weight is connected to the lure at the point of pivotal connection of the lure with the fishing line, so that the added weight does not affect the wiggling or vibratory motion of the lure.

Another object of the invention is to provide, in a lure of the character described, a deflecting plate or spoon secured to the body of the lure at the forward end thereof and extending downwardly and forwardly from below the nose of the lure for causing an erratic or wiggling movement of the lure as the same is drawn through the water, said deflecting plate or spoon having an elongate medial vertical slot provided therein whereby a snap fastener may be engaged through the slot with the eye of the hooks or the hook link carrying the hooks for connecting the fishing line directly to the hooks.

A further object of the invention is to provide a lure of the character described having a slotted deflecting plate or spoon wherein the jetting of water through said slot causes the jetted water to act against a flattened weight suspended at the point of connection of the snap fastener with the hook eye or hook link to cause the weight to move to increase the erratic movement of the lure.

Another object of the invention is to provide a lure of the character described having improved means for attaching a trailing wiggler, such as a pork rind or feathers or the like, to the lure adjacent the hooks for increasing the effectiveness of the lure.

Additional objects and advantages of the invention will readily be apparent from the reading of the following description of a device constructed in accordance with the invention, and reference to the accompanying drawings thereof, wherein:

Figure 1 is a side elevation of a lure embodying the invention,

Figure 2 is a front end view of the lure,

Figure 3 is a longitudinal vertical sectional view through the lure of Figure 1, Figure 4 is an underside view of the lure, Figure 5 is an underside view of a slightly modified form of the lure, and Figure 6 is a longitudinal vertical sectional view of the lure of Figure 5.

In the drawings, in which like numerals designate like parts throughout the several views, the numeral 10 designates an elongate metallic plate having a downwardly and forwardly inclined deflecting plate or spoon 11 at its front end and having a downturned slotted flange 12 at its rear end. A lure or plug body 13 of plastic, wood or other suitable material, is shaped to fit on the upper surface of the plate 10, and is held in place on said plate by means of a single screw 14 which extends through an opening 15 in the plate and is threaded into the lure body. For preventing pivotal movement of the lure body about the screw 14, the body is provided with an integral projecting lug 16 on its under surface, and said lug is adapted to fit in an opening or recess 17 in the plate. It is believed obvious that the plate may be formed concave and the lower surface of the lure body formed convex to fit in such concave plate, if desired, so that the lure body will be held against pivotal movement about the screw 14 which connects the body to the plate.

A double hook 18 having a pair of spaced elongate resilient shanks 19 and a common eye opening 20, has its shanks extending inwardly through the slot 21 in the slotted flange 12 at the rear end of the plate, and its eye opening 20 is positioned adjacent the rear side of the downturned deflecting plate 11 at the front end of the plate. The shanks 19 of the double hook are spread slightly apart and pass on opposite sides of the screw 14, as shown best in Figure 4, so that the rear portions of the shanks are spread outwardly into engagement with the sides of the slot 21 in the slotted flange. Thus, due to the reduced space between the shanks of the hook adjacent the eye opening, the hook is restrained against movement rearwardly with respect to the body and plate; and, due to the engagement of the eye opening of the hook with the rear side of the deflecting plate 11, the hook is prevented from moving forwardly with respect to the body and plate. Also, since the shanks are confined between the head of the screw and the bottom of the plate 10, the double hook is held against displacement from the plate and body.

An elongate thin flat wiggler 22 which may be formed of a piece of chamois, pork rind, a feather or the like, has its inner end extending through the slot 21 and is clamped between the shanks 19 of the hook and the underside of the plate, being held in place by the clamping action of the head of the screw acting upon the shanks of the hook. The points of the double hook extend outwardly beyond and upwardly above the rear end of the plug body, and the wiggler 22 extends rearwardly between the hooks. The points of the hook thus ride uppermost, which will reduce the chance of the lure being caught in brush or weeds.

The downwardly inclined deflecting plate or spoon 11 is preferably substantially concave in configuration, as clearly shown in Figures 1, 3 and 4. An elongate vertically extending slot 23 is formed medially of the deflecting plate and extends rearwardly from the deflecting plate a short distance axially of the body plate 10 (Figure 3). The forward end of the lure body 13 is provided with a concave recess 24 which extends upwardly and outwardly from the plate to the upper forward end of the body. Thus, access may be had to the axial portion of the slot 23 in the plate 10 rearwardly of the deflecting plate or spoon, so that a snap fastener hook 25 may be engaged through the slot 23 and hooked through the eye opening 20 of the double hook, which is positioned beneath the slot in the plate and behind the spoon. The snap fastener hook may be connected to a suitable swivel member 26 which is in turn connected to the usual fishing line L.

The snap hook loop of the snap fastener 25 is thus positioned substantially vertically in the slot 23, and the lure may pivot on the snap hook about the forward portion of the eye opening 20 of the double hook. The slot is sufficiently wide so that lateral swiveling or wiggling movement of the lure will not be limited by the engagement of the sides of the slot with the snap fastener hook loop.

The plate 10 is preferably of a substantial thickness, so that the mass of the plate, being on the lower side of the lure body 13, will tend to cause the lure to move through the water in the upright position shown in Figure 1. The weights of the downwardly and forwardly inclined deflecting plate 11 and the downturned flange 12 at the rear end of the plate 10, being below the point of connection of the lure with the line snap hook, also will assist in maintaining the plug in an upright position as it travels through the water.

A flattened weight member 27, preferably of lead or the like, having a connecting eye 28, may be connected to the hook loop of the hook fastener 25 to the rear of the deflecting plate 11 and below the eye opening 20 of the double hook, as clearly shown in Figures 1 and 3. The weight is so secured to the connecting eye that the major cross-sectional dimension of the weight is positioned substantially parallel to the deflector plate and perpendicular to the plot 23 in said deflector plate. This weight is used when it is desired to cause the plug to sink deeper in the water, and weight members of different sizes may be used to cause the lure to travel at different depths in the water.

Due to the fact that the weight is connected to the lure at the point of swiveling or pivoting of the lure about the hook loop of the snap fastener 25, which is the eye opening 20 of the double hook 18, it will be seen that the weight will not materially affect the erratic wiggling movement of the lure. Also, due to the fact that its large flattened surface is positioned perpendicular to the slot 23 in the deflector plate 11, it will be seen that the jet of water which passes through the slot will act against the flattened surface of the weight to move or swing the weight and increase the erratic movement of the lure as it travels through the water.

In the modified form of the invention shown in Figures 5 and 6, the double hook 18 has been replaced with a multiple gang hook 30 having three points with their shanks 31 soldered or otherwise connected together, and provided with an eye opening 32 connected with an elongate hook connecting link 33. The hook connecting link is formed of a spring wire bent upon itself to form an eye loop 34 at one end and having elongate closely spaced resilient arms 35 extending rearwardly from the eye loop substantially parallel to each other. One of the resilient arms is considerably longer than the other and is bent back upon itself to form a connecting loop 36 at the end of the link opposite the eye loop 34 for connection to the eye opening of the gang hook. The back-turned section 37 of the longer arm extends forwardly past the rear end of the shorter arm, as clearly shown in Figure 5.

This elongate wire connecting loop or link 33 is positioned on the underside of the plate 10 of the lure with its eye loop 34 immediately behind the downturned deflector plate or spoon 11 and below the rearwardly extending portion of the slot 23 in the plate, in the same manner as the eye opening of the double hook previously described, so that the snap fastener hook may be engaged with the eye loop for connecting the lure to the fishing line. The parallel resilient arms 35 of the link extend rearwardly from the slot on opposite sides of the screw 14, as best shown in Figure 5, so that the arms of the link are spread apart by the screw and longitudinal movement of the link with relation to the body and plate is restrained or prevented in the same manner as in the form first described, and the link is positively clamped in place on the under side of the plate by the head of said screw. The connecting loop 36 at the rear end of the link extends outwardly through the slot 21 in the rear slotted flange 12 of the plate 10, but the back-turned section 37 of the connecting loop is positioned in the slot to close the loop after the connecting loop has been engaged through the eye 32 of the gang hook. The shorter arm 35 of the link otherwise is sufficiently long to extend rearwardly into the slot in the slotted flange, and is disposed between the back-turned arm 37 and the opposite arm 35 of the link. Thus, the connecting loop at the rear of the link is maintained closed and the fishing line is connected positively with the hooks on the lure.

The wiggler member 22 may be inserted between the rearwardly extending arms of the hook connecting link and the underside of the plate 10, so as to be clamped therebetween when the screw is tightened, and will extend outwardly through the slot 21 in the slotted flange and rearwardly therefrom, in the manner previously described. The rear portion of the connecting loop 36 extending beyond the flange 12 is preferably curved slightly downwardly, as best shown in Figure 6, to permit the gang hook to clear the rear end of the plug body and the wiggler.

All other parts of this modified form of the lure are the same as the form previously described, and operate and function in the same manner.

It is believed manifest that the shape and color arrangement or combination of the lure body may be changed, as desired, simply by replacing one body member with another having the desired shape and color combination. Since the lure body is connected to the plate by a single screw, this change may be quickly and simply effected.

Furthermore, if desired, the body and plate may be formed of an integral piece of plastic or the like, with the forwardly extending downturned deflector plate 11 and the down-turned slotted flange 12 integral with the body. Such structure would reduce further the cost of the lure.

From the foregoing, it will be seen that an improved fishing lure has been provided in which the hooks, or the hook connecting link, are arranged for direct connection with the fishing line, rather than being separately connected by eye screws to the body of the plug or lure, so that the danger of losing the hooks from the line and lure is minimized.

The lure is provided with a deflecting plate or spoon near its forward end which has a vertically extending slot disposed medially thereof and so arranged that a snap fastener may be engaged through the slot with the eye of the hook, or the hook carrying link carrying the hooks, for connecting the fishing line directly to the hooks. This minimizes the danger of loss of the hooks from the line.

It will particularly be noted that the lure body, the hooks, and the downwardly and forwardly inclined spoon or deflecting plate are all connected and secured together by a single screw, facilitating assembly and reducing the cost of the lure. Likewise, the plate, deflecting spoon and hooks are all so connected together that they cannot be lost from the line without breaking the line or the connection with the line. Furthermore, the connection of the lure body with the plate by a single screw permits changing the body of the plug or lure so that different body shapes and color arrangements may be readily obtained simply by replacing or changing the plug body member.

It will also be noted that means has been provided on the lure for varying the weight of the lure by adding a weight member thereto, such additional weight being connected to the lure at the point of pivotal connection of the lure with the fishing line so that the added weight does not affect the wiggling or vibratory motion of the lure as it moves through the water. Likewise, the water jetted through the slot in the deflecting plate or spoon at the front end of the lure acts against the flattened weight member to cause the weight to move and thus increase the erratic movement of the lure. Furthermore, weights so connected with the plug are not so likely to become fouled or tangled with the line as would weights connected to the line ahead of the lure.

In addition, the lure is particularly adapted to have a trailing wiggler, such as a pork rind, feathers, or the like, detachably secured to the lure adjacent the hooks for increasing the effectiveness of the lure.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A fishing lure including, a body having a forwardly extending elongate plate provided with a downwardly inclined deflecting plate at its front end and a down-turned slotted flange at its rear end, a pair of elongate resilient hook carrying connecting members extending inwardly through the slotted flange and having an eye opening at their forward end, the deflecting plate having a vertically disposed slot formed therein and extending rearwardly in the forwardly extending elongate plate a short distance axially of the body, the eye opening at the forward end of the connecting members being disposed below the slot in the forwardly extending elongate plate and immediately behind the downwardly inclined deflecting plate whereby a fishing line may be connected with said eye opening, and a screw threaded through said forwardly extending elongate plate and into the body and extending between the resilient connecting members and clamping said connecting members between the head of the screw and the under side of the forwardly extending plate.

2. A fishing lure including, a body having a forwardly extending elongate plate provided with an integral deflecting plate at its forward end extending forwardly of the body a short distance, said deflecting plate being inclined downwardly and forwardly below the body and having a vertically disposed slot formed centrally therein continuing rearwardly in the forwardly extending elongate plate axially of the body, a down-turned slotted flange on the rear end of the under side of the forwardly extending elongate plate, a double hook having a pair of closely spaced resilient shanks and a common eye opening, said shanks extending inwardly through the slotted flange at the rear of the body and having the eye opening disposed beneath the portion of the slot in the forwardly extending elongate plate and abutting against the rear of the downwardly and forwardly inclined deflecting plate, and a screw extending between and spreading the shanks of the double hook and threaded through said forwardly extending elongate plate and into the body for clamping the shanks of the hooks against the under side of the forwardly extending elongate plate.

3. A fishing lure including, a forwardly extending elongate plate having a downwardly and forwardly inclined deflecting plate at its front end and a down-turned slotted flange at its rear end, a pair of elongate resilient hook carrying connecting members extending inwardly through the slotted flange and having an eye opening at their inner end, the deflecting plate having a vertically disposed slot formed therein and extending rearwardly from said deflecting member axially through the forward portion of the forwardly extending elongate plate, the eye opening at the inner end of the connecting members being disposed below the portion of the slot in the forwardly extending elongate plate and immediately behind the deflecting plate whereby a fishing line may be connected with said eye opening, a body member on the upper surface of the forwardly extending elongate plate, and a screw extending through said forwardly extending elongate plate and threaded into the body for holding the body on the forwardly extending elongate plate, said screw also extending between the resilient connecting members and clamping said connecting members between the head of the screw and the under side of the forwardly extending elongate plate.

4. A fishing lure including, a body, an elongate plate connected to the under side of the body by a screw extending through the plate and threaded into the body, a double hook having a pair of spaced resilient shanks and a common eye opening, a slotted flange at the rear end of the under side of the plate, the shanks of the double hook extending through the slot in the flange and on opposite sides of the screw, said screw having a head clamping the shanks of the hooks to the under side of the plate with the eye opening at the front end of the plate.

5. A fishing lure including, a body, an elongate plate having a downwardly and forwardly inclined deflecting plate at its front end and a down-turned slotted flange at its rear end, a pair of elongate resilient hook connecting arms extending inwardly through the slot in the flange and having an eye opening at their inner end disposed immediately behind the deflecting plate on the under side of the elongate plate, and a screw extending between the resilient connecting arms and through the plate and threaded into the body, the head of the screw clamping the resilient connecting members against the under side of the elongate plate and holding the body in place on the upper side of said plate, the deflecting plate having a vertical slot through it providing access to the eye opening at the forward end of the resilient connecting arms whereby a fishing line may be connected to said eye opening.

6. A fishing lure including, an elongate plate having a downwardly and forwardly inclined deflecting plate at its front end and a down-turned slotted flange at its rear end, a pair of elongate resilient hook carrying connecting members extending inwardly through the slotted flange along the under side of the elongate plate and having an eye opening at their inner end disposed immediately behind the inclined deflecting plate, the deflecting plate having a vertically disposed slot formed therein and extending rearwardly from said deflecting plate axially of the elongate plate above the eye opening of the connecting members, a body on the upper surface of the elongate plate, and a screw extending through said elongate plate member and threaded into the body for holding the body member on the elongate plate member, said screw also extending between the resilient connecting members and clamping said connecting members between the head of the screw and the under side of the elongate plate.

7. A fishing lure including, an elongate plate having a downwardly and forwardly inclined deflecting plate at its front end and a down-turned slotted flange at its rear end, a pair of elongate resilient hook carrying connecting members extending inwardly through the slotted flange along the under side of the elongate plate and having an eye opening at their inner end disposed immediately behind the inclined deflecting plate, the deflecting plate having a vertically disposed slot formed therein and extending rearwardly from said deflecting plate axially of the elongate plate above the eye opening of the connecting members, a body on the upper surface of the elongate plate, a screw extending through said elongate plate and threaded into the body for holding the body on the plate, said screw also extending between the resilient connecting members and clamping said connecting members between the head of the screw and the under side of the elongate plate, a flattened weight member, and means swingably connecting the weight member with the eye opening of the hook carrying connecting members and disposing said weight member behind the inclined deflecting plate with the major cross-sectional dimension of said weight member perpendicular to the slot in said deflecting plate.

8. A fishing lure including, an elongate plate having a downwardly and forwardly inclined deflecting plate at its front end and a down-turned slotted flange at its rear end, a pair of elongate resilient hook carrying connecting members extending inwardly through the slotted flange along the under side of the elongate plate and having an eye opening at their inner end disposed immediately behind the inclined deflecting plate, the deflecting plate having a vertically disposed slot formed therein and extending rearwardly from said deflecting plate axially of the elongate plate above the eye opening of the connecting members, a body on the upper surface of the elongate plate, a screw extending through said elongate plate and threaded into the body for holding the body on the elongate plate, said screw also extending between the resilient connecting members and clamping said connecting members between the head of the screw and the under side of the elongate plate, and a wiggler member having one end extending inwardly through the slotted flange and clamped between the hook carrying connecting members and the under side of the elongate plate and extending outwardly rearwardly from the elongate plate.

9. A fishing lure including, a body, a plate connected to the under side of the body by a screw extending through the plate and threaded into the body, a double hook having a pair of spaced resilient shanks and a common eye opening, a slotted flange at the rear end of the under side of the plate, the shanks of the double hook extending through the slot in the flange and on opposite sides of the screw, said screw having a head clamping the shanks of the hooks to the under side of the plate with the eye opening at the front end of the plate, and a wiggler member having one end extending inwardly through the slotted flange and clamped between the shanks of the double hook and the under side of the plate and having its other end extending rearwardly from the plate between the double hooks.

10. A fishing lure including, a body, a plate connected to the under side of the body by a screw extending through the plate and threaded into the body, a double hook having a pair of spaced resilient shanks and a common eye opening, a slotted flange at the rear end of the under side of the plate, the shanks of the double hook extending through the slot in the flange and on opposite sides of the screw, said screw having a head clamping the shanks of the hooks to the under side of the plate with the eye opening at the front end of the plate, a flattened weight member and means pivotally connecting said weight member with the eye opening of the double hook and positioning said weight member with its major cross-sectional dimension disposed transversely of the longitudinal axis of the plate.

11. A fishing lure including, an elongate plate having a downwardly and forwardly inclined deflecting plate at its front end and a downturned transversely slotted flange at its rear end, a pair of elongate resilient hook-carrying connecting members extending inwardly through the slotted flange along the underside of the elongate plate and having an eye opening at their inner end disposed immediately behind the inclined deflecting plate, the deflecting plate having a vertically disposed slot formed therein and extending rearwardly from said deflecting plate axially of the elongate plate above the eye opening of the connecting members, and a screw extending between the resilient connecting members and threaded into the elongate plate for clamping said connecting members between the head of the screw and the underside of the elongate plate.

12. A fishing lure including, an elongate body plate having a downwardly and forwardly inclined deflecting plate at its front end and a downturned transversely slotted flange at its rear end, a double hook having a pair of spaced resilient shanks and a common eye opening, the shanks of the double hook extending through the transverse slot in the flange at the rear of the body plate and extending forwardly along the underside of the elongate body plate and having their eye opening disposed immediately behind the inclined deflecting plate, the deflecting plate having a vertically disposed axial slot formed therein and extending rearwardly from the deflecting plate axially of the elongate body plate past the eye opening of the double hook, and a screw extending between the resilient shanks of the hooks and threaded into the elongate body plate and having a head clamping said shanks to the underside of said body plate.

MATTHEW J. ISAAC.

REFERENCES CITED

The following references are of record in the file of this patent:

UNITED STATES PATENTS

| Number | Name | Date |
|---|---|---|
| 1,440,869 | Foss | Jan. 2, 1923 |
| 1,615,963 | Stanley | Feb. 1, 1927 |
| 2,333,174 | Heddon | Nov. 2, 1943 |
| 2,459,819 | Hoage | Jan. 25, 1948 |
| 2,492,064 | Raub | Dec. 20, 1948 |